United States Patent
Niemelä

[11] Patent Number: 5,978,675
[45] Date of Patent: Nov. 2, 1999

[54] METHOD FOR MEASURING THE NOISE LEVEL OF A BASE STATION ENVIRONMENT

[75] Inventor: Kari Niemelä, Oulu, Finland

[73] Assignee: Nokia Telecommunications Oy, Espoo, Finland

[21] Appl. No.: 08/617,907
[22] PCT Filed: Jul. 17, 1995
[86] PCT No.: PCT/FI95/00403
§ 371 Date: Mar. 18, 1996
§ 102(e) Date: Mar. 18, 1996
[87] PCT Pub. No.: WO96/04760
PCT Pub. Date: Feb. 15, 1996

[30] Foreign Application Priority Data

Jul. 20, 1994 [FI] Finland ................................. 943446

[51] Int. Cl.⁶ .................................................. H04Q 7/30
[52] U.S. Cl. ......................... 455/423; 455/561; 455/424; 455/67.1; 455/450
[58] Field of Search ................................. 455/423, 424, 455/67.1, 437, 450, 561; 370/329, 332, 252, 241, 337

[56] References Cited

U.S. PATENT DOCUMENTS

| | | | |
|---|---|---|---|
| 5,381,443 | 1/1995 | Borth et al. | 370/329 |
| 5,471,649 | 11/1995 | Rees et al. | 455/423 |
| 5,491,837 | 2/1996 | Haartsen | 455/450 |
| 5,521,904 | 5/1996 | Eriksson et al. | 370/252 |
| 5,570,373 | 10/1996 | Wing | 370/241 |
| 5,572,510 | 11/1996 | Koivu | 455/67.1 |
| 5,604,728 | 2/1997 | Jylha | 370/241 |
| 5,627,880 | 5/1997 | Rozanski et al. | 455/437 |
| 5,737,359 | 4/1998 | Koivu | 455/561 |

FOREIGN PATENT DOCUMENTS

| | | |
|---|---|---|
| 2 696 602 | 4/1994 | France . |
| 42 15 422 | 11/1992 | Germany . |
| 9211736 | 7/1992 | WIPO . |

*Primary Examiner*—Wellington Chin
*Assistant Examiner*—Keith Ferguson
*Attorney, Agent, or Firm*—Pillsbury Madison & Sutro LLP

[57] ABSTRACT

For measuring the disturbance level of a base station that has at least one frequency hopping receiver and a way of measuring the signal level of signals received by the receiver, a free traffic channel is allocated. The allocated channel is caused to hop sequentially through all the frequency channels that the base station uses for reception, while signal levels of received signals are measured, and the results are transmitted to an operator. The base station also is provided with a site test and measurement unit, which is used for comparably measuring and reporting results in regard to frequency channels that the base station uses for transmission.

10 Claims, 2 Drawing Sheets

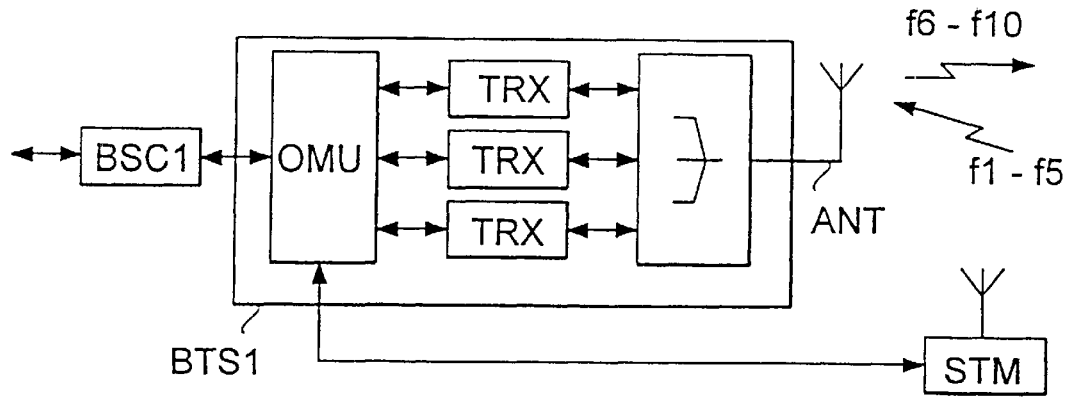
FIG. 1
| CH | BTS RX-BAND | MS RX-BAND |
|---|---|---|
| f1 | -100 dBm | — |
| f2 | -102 dBm | — |
| . | . | . |
| . | . | . |
| . | . | . |
| f9 | — | -99 dBm |
| f10 | — | -90 dBm |
FIG. 2
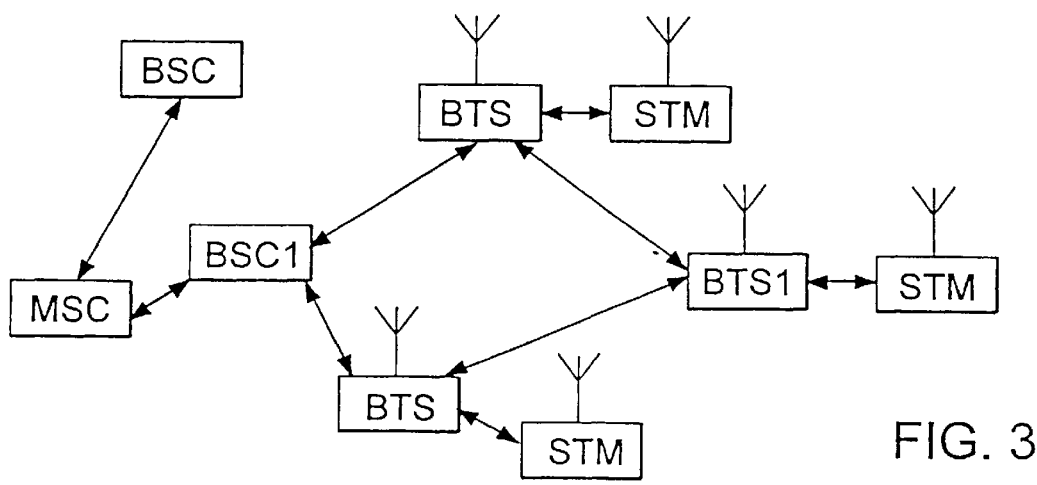
FIG. 3

| CH | BTS1 RSSI | BTS2 RSSI |
| --- | --- | --- |
| f1 | -100 dBm | -88 dBm |
| f2 | -102 dBm | -87 dBm |
| . | . | . |
| . | . | . |
| . | . | . |
| f9 | -99 dBm | -90 dBm |
| f10 | -90 dBm | -95 dBm |

METHOD FOR MEASURING THE NOISE LEVEL OF A BASE STATION ENVIRONMENT

BACKGROUND OF THE INVENTION

The present invention relates to a method for measuring the disturbance level of a base station environment, which base station comprises at least one receiver utilizing frequency hopping, and means for measuring the signal level of signals received by the receiver. The invention further relates to a cellular communication system comprising a mobile switching centre, a base station controller and base stations, whereby the system comprises a base station with at least one receiver utilizing frequency hopping, and means for measuring the levels of the signals received by the receiver.

The present invention relates to spectral analysis carried out in the base station environment, the object of the analysis being to detect and locate the factors disturbing the system. In a prior art solution for measuring the disturbance level in a base station environment of a cellular communication system, a separate spectrum analyzer is taken to the base station site whenever problems occur. The spectrum analyzer is then used for monitoring possible disturbances by measuring the signal levels of the received signals on all the frequency channels used by the base station. In cases where the disturbance that disturbs the operation of a base station is sporadic (a fast data link, for example), it has even been necessary to wait for its occurrence.

The solution described above for measuring the disturbance level is very slow and expensive, as it requires, in addition to a separate measuring device, active participation by the service personnel during the measurements, as well as for the handling and transportation of the spectrum analyzer.

SUMMARY OF THE INVENTION

The object of the present invention is to solve the aforementioned problems and offer a more user friendly and faster method for carrying out disturbance level measurements in a base station environment. This object is achieved by the method of the invention which is characterized by allocating a free traffic channel in the receiver, making the traffic channel hop from one receive frequency channel of a base station to another, and measuring the signal levels of the signals received on the frequency channels, and transmitting a report on the measurement results to the operator.

The present invention further relates to a cellular communication system in which the method of the invention can be utilized. It is characteristic to the system of the invention that a base station comprises measuring means for making a traffic channel hop from one receive frequency channel of a base station to another, and for measuring the signal levels of the signals received on said frequency channels, as well as transmitting a report on the measurement results to the base station controller.

The invention is based on the idea that measuring disturbance level of a base station environment is made considerably easier and faster as the measurements are carried out by making a free traffic channel of a base station hop so that it goes through all the receive frequency channels of the base station, and measures the levels of signals received on all of those channels. If the base station is sectorized, the measurements can be carried out, for example, in one sector at a time.

In a time divisional (TDMA) communication system, disturbance level measurements strain the traffic capacity of the base station very little, because the measurements can be carried out by using a single time slot. On the other hand, if the communication system in question is not of a time divisional type, this means that the disturbance level measurements take up the entire capacity of a receiver for the duration of the measurements. Disturbance level measurements in accordance with the present invention can easily and with only minor modifications be applied to existing communications systems, because, in many systems, the receiver of the base station already comprises the necessary measuring means for measuring the signal level of the received signal. The invention can be applied to such systems by adding a computer program to them for controlling the test. Thus, the most significant advantages of the method and system of the invention are simplicity, easy and quick implementation, modest capacity requirements, and a possibility for an automatic continuous control without any need for the operator to even know about the execution of the test if the system does not provide an alarm to the operator due to abnormal measurement results.

In a preferred embodiment of the system of the invention, a base station is provided with a prior art STM (Site Test and Measurement) unit. A site test and measurement unit such as this, simulating the operation of an ordinary mobile station, is in common use in, for example, base stations of the GSM (Groupe Spécial Mobile) system. In this preferred embodiment of the invention, the receiver of the site test and measurement unit is made hop sequentially to the frequency channels which are used for transmitting by the base station, in which case the receiver of the unit measures the levels of signals received on those frequency channels. This embodiment of the invention can be applied to, for example, a base station of the GSM system in which every transceiver is of full-duplex type, and the duplex spacing between their transmit and receive frequencies is 45 MHz. Thus, a frequency hopping receiver measures the receive frequencies of the base station, and the receiver of the frequency hopping site test and measurement unit measures the transmit frequencies of the base station (i.e. the receive frequencies of mobile stations).

BRIEF DESCRIPTION OF THE DRAWINGS

In the following, the invention will be described in greater detail by means of examples with reference to the attached drawings in which:

FIG. 1 is a block diagram illustration of a base station,

FIG. 2 illustrates measurement results transmitted from the base station of FIG. 1 to a base station controller, FIG. 3 is a block diagram illustration of a part of a cellular communication system.

DETAILED DESCRIPTION

Figures 4, 5:
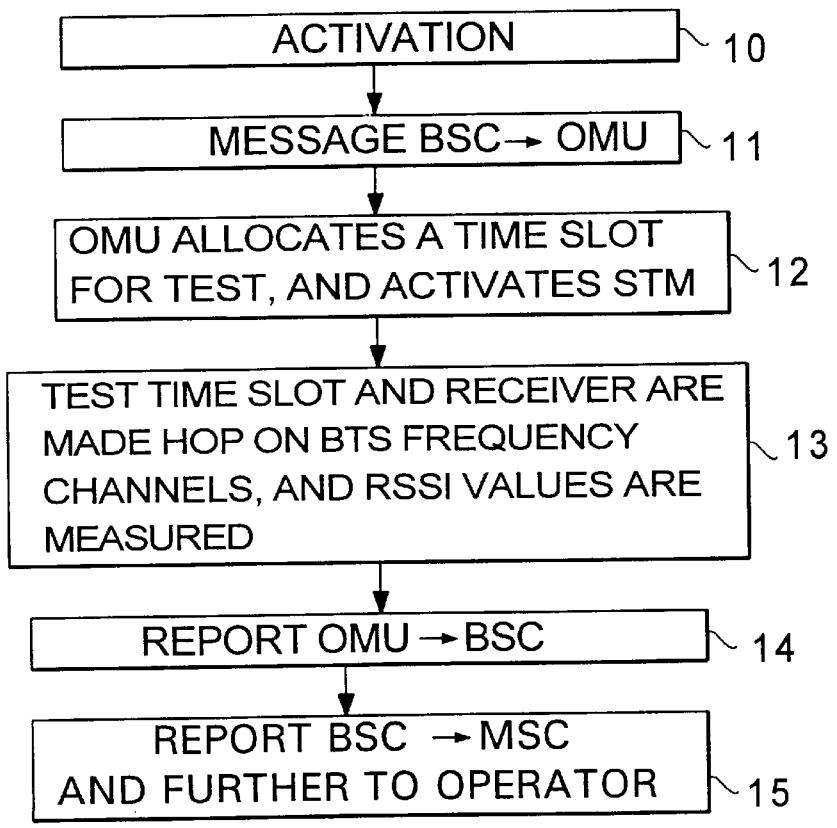
FIG. 4 illustrates measurement results transmitted from the base station controller of FIG. 3 to a mobile switching center.
FIG. 5 illustrates a preferred embodiment of a method of the invention.

FIG. 1 shows a block diagram of a base station BTS1 of the GSM system. The structure and operation of the GSM system is described, for example, in "The GSM System for Mobile Communications", by M. Mouly & M-B Pautet, Palaiseau, France, 1992, ISBN: 2-9507190-0-7, and so, they are not described here in any closer detail.

The base station BTS1 (Base Transceiver Station) of FIG. 1 comprises three transceivers TRX which, through a combined transmit and receive antenna ANT, communicate with mobile stations within the radio coverage area of the base station at any given moment of time. Each transceiver TRX is of full-duplex type and there is a duplex spacing of 45 MHz between its receive and transmit frequencies. The receive units TRX comprise measuring means for measuring the power level RSSI (Received Signal Strength Indication) of the received signals in a way which is known per se.

The operation of a base station BTS1 is controlled by an OMU (Operation and Maintenance Unit) communicating with the BSC1 (Base Station Controller), and which controls the synthesizer frequency hopping of the transceivers TRX so that the base station BTS1 receives radio signals on the frequency channels f1–f5, and transmits signals on the frequency channels f6–f10. The operation and maintenance unit OMU further controls an STM (Site Test and Measurement Unit) which is provided in connection with the base station BTS1, which STM unit can simulate an ordinary subscriber unit by transmitting radio signals to the base station BTS1.

The base station controller BSC1 of FIG. 1 comprises means for activating the operation and maintenance unit OMU and the site test and measurement unit STM for measuring the disturbance level of a base station environment. In such a case, the operation and maintenance unit allocates a free traffic channel, i.e. a time slot, in a transceiver TRX of the base station. Following this, the operation and maintenance unit determines a frequency hopping sequence for the selected time slot, whereby all the frequencies f1–f5 which the base station uses for reception are gone through sequentially one-by-one by utilizing synthesizer frequency hopping. The selected time slot remains on each given frequency channel for the time it takes for the receiver of the transceiver used to measure the signal level RSSI of the signals received on the respective frequency channel, i.e. approximately 1 second/frequency channel. As soon as the measurements have been carried out, the operation and maintenance unit OMU transmits the RSSI values measured by the receiver further to the base station controller BSC1.

While any one of receivers TRX of the base station is measuring the receive frequency channels of the base station, the operation and maintenance unit OMU directs the site test and measurement unit STM of the base station to measure the transmit frequencies f6–f10 of the base station. This measurement is also performed by making the receiver of the site test and measurement unit STM hop from one frequency channel to another, so that signal levels RSSI of the received signals can be measured from all the transmit frequencies f6–f10 of the base station. The site test and measurement unit transmits the measurement results to the operation and maintenance unit OMU, which, as soon as the measurements have been carried out, transmits them further to the base station controller BSC1.

The operation and maintenance unit OMU comprises means for correcting the measurements that have been carried out by taking into account signals of connections that take place through the base station. In other words, if a base station, for example, has an ongoing call on a certain frequency channel while the site test and measurement unit STM is carrying out measurements on the corresponding channel, this naturally shows in the measurement result. The operation and maintenance unit OMU is, however, aware of the used frequencies, and therefore is able to compensate the measurement results prior to transmitting them to the base station controller BSC1.

FIG. 2 illustrates measurement results that are transmitted from the base station BTS1 of FIG. 1 to a base station controller BSC1. The chart of FIG. 2 shows the levels (RSSI) of signals measured frequency channel specifically on the receive channels f1–f5 (BTS-BAND) and on the transmit channels f6–f10 (MS-BAND) of the base station.

FIG. 3 is a block diagram illustration of a part of a cellular communication network, to which part the base station BTS1 of FIG. 1 belongs. FIG. 3 shows a part of a GSM network which comprises a MSC (Mobile Switching Center), base station controllers BSC and BSC1, base stations BTS and BTS1 and site test and measurement units STM provided with the base stations.

The base station controllers BSC and BSC1 of FIG. 3 comprise means for initiating disturbance level measurements in the base stations BTS and BTS1 coupled to them, and for receiving and processing the measurement results transmitted by the base stations. As soon as the base station controller BSC1, for example, has received the measurement results from all the base stations coupled to it (three of them in FIG. 3), it transmits, through a mobile switching center MSC, a report to the operator indicating the measurement results of the different base stations.

Alternatively, the base station controller can compare the measurement results to values predetermined by the operator, and, if the measured values significantly differ from the reference values, transmit an alarm to the operator through a mobile switching center.

FIG. 4 illustrates measurement results transmitted from the base station controller of FIG. 3 to the mobile switching center. Thus, the report that is transmitted to the mobile switching center shows, base station specifically, the signal strength RSSI measured on each frequency channel. Thus, it is very simple for the operator to monitor the disturbance levels in different parts of the network.

FIG. 5 illustrates a preferred embodiment of the method of the invention. In block 10, the operator activates measurements of the disturbance level in the network by transmitting a message about it to the base station controllers, or alternatively, the mobile switching center performs the activation automatically at predetermined time intervals.

In block 11, the base station controllers transmit a measuring message to the operation and maintenance unit of the base station. In block 12, the operation and maintenance unit (in each base station), while activating the site test and measurement unit for the test, allocates a free time slot in the receiver of the base station.

In block 13, the allocated time slot is made hop through all receive frequencies of the base station, and the receiver of the site test and measurement unit is to made to hop through all transmit frequencies of the base station. A RSSI value is measured for all the frequency channels used by the base station, which value is then transmitted to the operation and maintenance unit by the receiver of the base station and the receiver of the site test and measurement unit.

In block 14, the operation and maintenance unit transmits a report on the measurement results to the base station controller. The base station controller compiles all the reports sent by base stations coupled to it, and then, in block 15, transmits the reports further to the mobile switching center which informs the operator of them.

It should be understood that the description above and the attached drawings are only meant to illustrate the present invention. Different kinds of variations and modifications of the invention will be obvious for a person skilled in the art without departing from the scope and spirit of the attached claims.

I claim:

1. A method for measuring the disturbance level in the environment of a base station which has at least one receiver utilizing frequency hopping, and a way of measuring the signal level of signals received by said receiver, comprising the steps of:

allocating a free traffic channel in the receiver for use in said measuring causing said traffic channel to hop sequentially through the frequency channels which the base station uses for reception of signals, while measuring the signal levels of signals received on said frequency channels used for reception, to thereby obtain receive measurement results, and transmitting a message on said receive measurement results to an operator.

2. The method as claimed in claim 1, in which the base station also has a site test and measurement unit having a receiver utilizing frequency hopping, further comprising:

causing said receiver of the site test and measurement unit to hop sequentially through the frequency channels which the base station uses for transmission of signals, while measuring the signal levels of the signals received on said frequency channels used for transmission, to thereby obtain transmission measurement results; and transmitting a message on said transmission measurement results to said operator.

3. The method as claimed in claim 1, further comprising:

comparing said receive measurement results to predetermined values; and and causing said message as transmitted to said operator to list only values that differ from said predetermined values.

4. The method as claimed in claim 1, wherein: said base station is a base station of a cellular communication system.

5. A cellular communication system, comprising: a mobile switching center;

a base station controller; and a plurality of base stations, including a base station which comprises at least one receiver arranged for utilizing frequency hopping, and means for measuring the signal level of signals received by said receiver;

said measuring means being arranged for causing a traffic channel to hop sequentially through the frequency channels which said base station uses for reception, for measuring the signal levels of signals received on said frequency channels used for reception, to thereby obtain receive measurement results, and for transmitting a message on said receive measurement results, to said base station controller.

6. The system as claimed in claim 5, further comprising:

said base station being provided with a site test and measurement unit having a receiver;

said site test and measurement unit having means for causing said receiver of said test and measurement unit to hop sequentially through the frequency channels which said base station uses for transmission, for measuring the signal levels of the signals received on said frequency channels used for transmission, to thereby obtain transmission frequency, and for transmitting a message on said transmission measurement results to said base station controller.

7. The system as claimed in claim 5, wherein:

said receiver arranged for utilizing frequency hopping has a capacity which is divided into TDMA time slots; and said measuring means further include means for making a time slot to hop for causing said traffic channel to hop frequently.

8. The system as claimed in claim 6, further comprising:

said base station controller being provided with means for activating said site test and measurement unit and said measuring means, means for receiving said messages on receive and transmission measurement results, and means transmitting a message on said receive and transmit measurement results, to said mobile switching center.

9. The system as claimed in claim 8, wherein:

said means of said base station controller for transmitting a message on the measurement results to the mobile switching center, is arranged to cause that message to contain base station-specific information about signal levels measured on the frequency channels used by said base station for receiving and transmitting.

10. The system as claimed in claim 5, wherein:

said cellular communication system is a GSM system.

* * * * *